Feb. 19, 1952  J. F. CAMPBELL  2,586,300
COLLAPSIBLE V BELT MOLD
Filed Aug. 7, 1947  2 SHEETS—SHEET 1
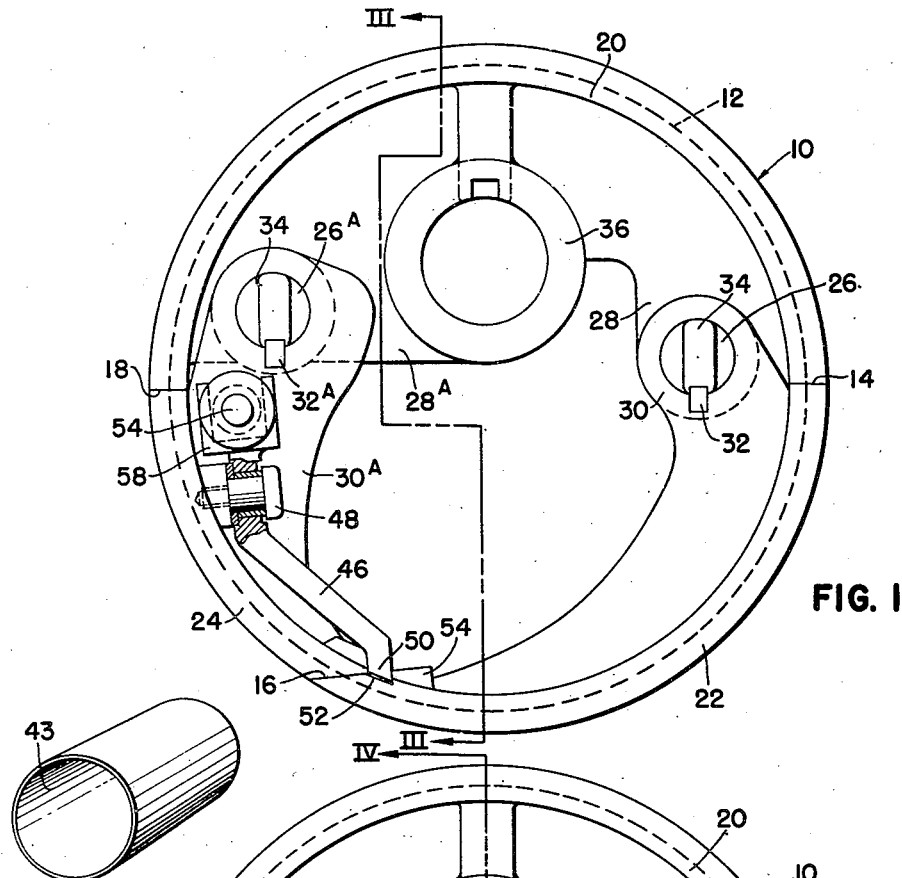
FIG. 1
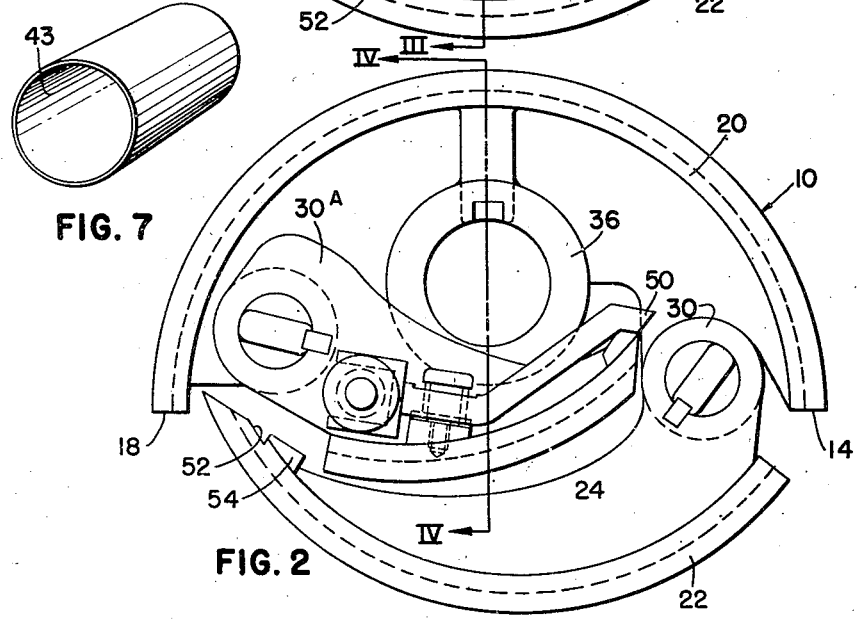
FIG. 7
FIG. 2
INVENTOR.
JOHN F. CAMPBELL
BY
Oldham & Oldham
ATTORNEYS Feb. 19, 1952     J. F. CAMPBELL     2,586,300
COLLAPSIBLE V BELT MOLD
Filed Aug. 7, 1947     2 SHEETS—SHEET 2
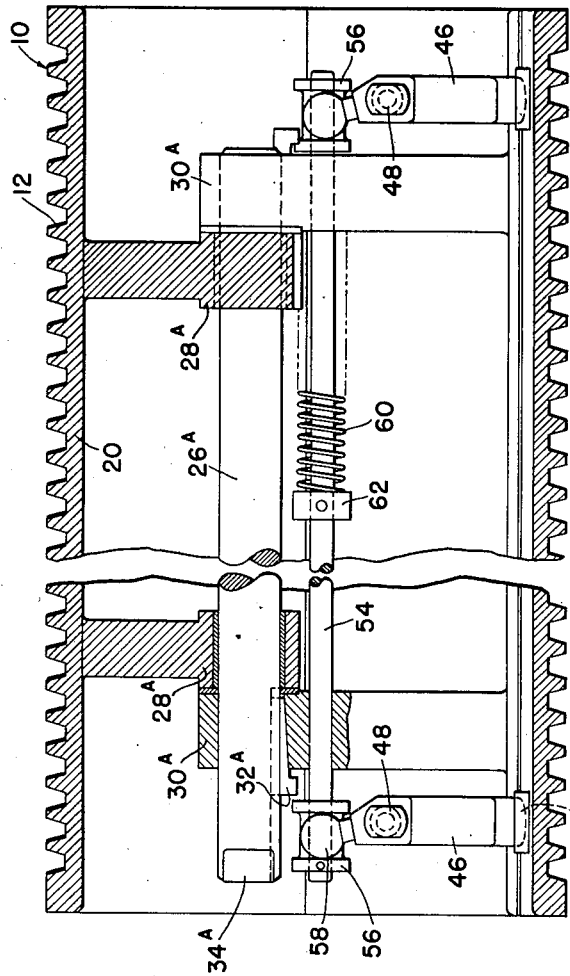
FIG. 3
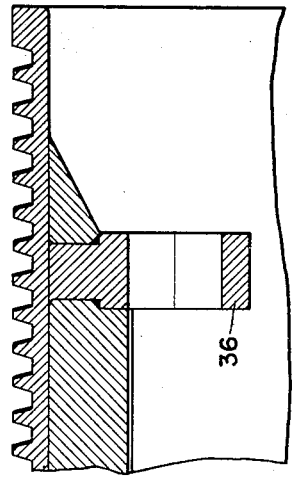
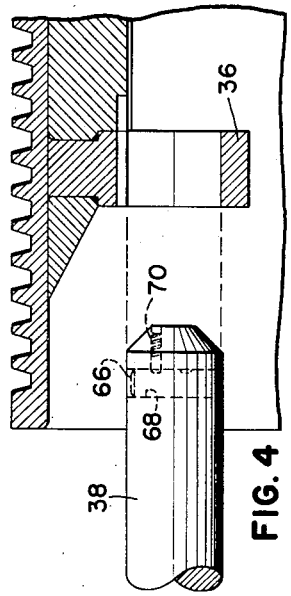
FIG. 4
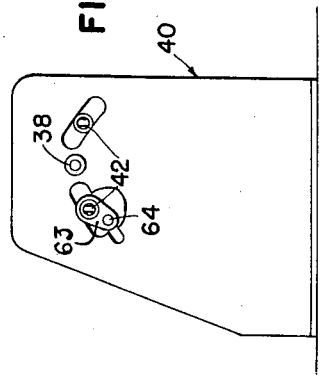
FIG. 5
FIG. 6
INVENTOR.
JOHN F. CAMPBELL.
BY
*Oldham & Oldham*
ATTORNEYS Patented Feb. 19, 1952

2,586,300

UNITED STATES PATENT OFFICE 2,586,300

COLLAPSIBLE V-BELT MOLD

John F. Campbell, Cuyahoga Falls, Ohio

Application August 7, 1947, Serial No. 766,903

15 Claims. (Cl. 18—34)

This invention relates to collapsible molds, and, more particularly, is concerned with collapsible drum type molds for vulcanizing V-belts, and the like.

Although the principles of the invention are broadly applicable to the manufacture, and, specifically, the vulcanization of a wide variety of products, the invention is particularly adapted to the manufacture and vulcanization of V-belts, and, accordingly, has been so illustrated and will be so described.

Heretofore in the manufacture of V-belts, it has been the usual practice to form a plurality of belts of rubber, rubberized fabric, a layer or layers of load carrying cords, cables, or wire, and with or without a rubberized fabric bias cut cover. The green or unvulcanized belts thus produced are then placed in molds which ordinarily take the form of a plurality of rings placed side by side, or, it might be said, one on top of the other, each pair of adjacent rings defining at their outer peripheries a cavity of V-shape to receive an unvulcanized belt. The plurality of rings are clamped together, and a rag or canvas is wrapped around the outer periphery of the ring to engage the outer surface of the belts, and the whole assembly is placed in a pot heater or steam chamber to effect the vulcanization of the belts. Upon the completion of the vulcanization, the assembly is removed from the heater, the wrap around the periphery is removed, and the individual rings are picked off one by one, the belts being stripped from the rings, and the operation is repeated.

It will be recognized that handling the hot and heavy rings is a hot, hard job. Moreover, it is a time consuming operation. Still again, registration of the rings, particularly after continued use, is a problem, sometimes resulting in off-angle registration which results in the production of belts which must be scrapped.

It is the general object of my invention to avoid and overcome the foregoing and other difficulties and objections to known apparatus for vulcanizing V-belts, and the like, by the provision of an improved, relatively inexpensive, quickly operated mold which has a minimum number of registration points and which can be operated by the ordinary semi-skilled operator to produce belts, and the like, of high quality with substantially no scrap loss.

Another object of my invention is to provide a V-belt mold of substantially cylindrical shape having a plurality of belt receiving cavities in its outer surface, the mold being collapsible from cylindrical shape to permit the removal of vulcanized belts and the positioning of unvulcanized belts thereon.

Another object of my invention is the provision of a mold of the type described and containing simple but positive lock means for holding the mold parts in expanded or cylindrical position.

Another object of my invention is to provide a collapsible mold such as described, including a simple hinge arrangement for facilitating the collapsing of the mold by external means and whereby the mold itself is free of gears, racks, levers, and other mechanism which is apt to cause trouble or become unworkable when subjected to repeated applications of heat.

Another object of my invention is to provide a collapsible mold for V-belts, and the like, the mold being characterized by lock means and collapsing mechanism operable from mechanism positioned inside of a mold support unit.

The foregoing objects of my invention, and other objects which will become apparent as the description proceeds, are achieved by the provision of a mold including a substantially cylindrical body portion having a plurality of molding grooves in its periphery, the body being split longitudinally into a plurality of parts, usually three, such as a stationary sector and two movable sectors, hinge means adjacent each longitudinal edge of the stationary sector and pivotally securing a movable sector thereto, the unhinged edges of the movable sectors overlapping in mating relation when the mold is in expanded position, lever means carried by a movable sector and movable to and from locking engagement with the other movable sector when the mold parts are in expanded position, longitudinally extending rod means slidably journaled in the movable sector carrying the lever means for operating the lever means, said hinge means including hinge pins fixed to the movable sectors and journaled in the stationary sector, said hinge pins extending to a position adjacent the ends of the mold where they can be operated by external means, and means associated with the stationary sector for receiving a support rod for the mold.

For a better understanding of my invention, reference should be had to the accompanying drawings, wherein:

Fig. 1 is an end view of a typical mold incorporating the principles of my invention, the mold being shown in full or expanded position;

Fig. 2 is a view similar to Fig. 1 but illustrating the mold in collapsed position;

Fig. 3 is a longitudinal vertical sectional view taken substantially on line III—III of Fig. 1, and having in addition certain portions of the mechanism broken away behind the sectional plane to better illustrate construction;

Fig. 4 is a fragmentary longitudinal sectional view taken substantially on line IV—IV of Fig. 2;

Fig. 5 is an end elevation of the supporting, collapsing and expanding apparatus with which the mold is used;

Fig. 6 is a side elevation of the apparatus of Fig. 5; and

Fig. 7 is a perspective view on a smaller scale of a flexible sleeve into which the mold of the invention can be expanded.

In the drawings, the numeral 10 indicates generally a hollow substantially cylindrical mold body which can be made of any desired length and diameter and which is formed in its outer periphery with a plurality of belt receiving and molding grooves 12. The words "substantially cylindrical" are used in the preceding sentence to describe the mold body 10 with the express intention that these words will include not only the usual structure of the mold body which is truly cylindrical, but would also cover any minor modifications of a cylindrical shape, such as a conical body or a body having two cylindrical portions of somewhat different diameters. It will be understood in this connection that the usual cylindrical mold body will make all of its belts of the same size. On the other hand, while not particularly practical, it would be possible to form the mold body of several different diameters to make belts of several different diameters on a single mold.

The mold body 10 is split longitudinally at a plurality of points, for example, as at 14, 16 and 18, into a plurality of parts, preferably three, the parts comprising a stationary sector 20 and movable sectors 22 and 24. The movable sector 22 is secured by hinge means to the stationary sector 20, the hinge means including a hinge pin 26 which is journaled in hinge eyes 28 carried by the stationary sector 20. Hinge eyes 30, usually formed integral with the movable sector 22, are keyed to the hinge pin 26, as by keys 32, and the hinge pin 26 is flattened or otherwise shaped at one end, as indicated by the numeral 34, so that the hinge pin can be turned together with the movable segment 22. In a like manner, the movable segment 24 is secured by substantially identical hinge means to the other side of the stationary sector 20, and inasmuch as the hinge means are substantially the same as those heretofore described, they have been indicated by like numerals, except the suffix "a" has been added. It will be recognized that the hinge eyes 30ª and 28ª are somewhat different in shape than the hinge eyes 30 and 28, to facilitate the construction and collapsing of the mold body.

The stationary sector 20 of the mold body is formed with support means, and these usually take the form of spaced, ring shaped bearings 36 which are secured to the stationary sector 20 at aligned longitudinally positioned points, the bearings being adapted to slide over a support rod 38 carried upon a supporting, collapsing and expanding apparatus indicated as a whole by the numeral 40. Thus, when the mold assembly is being serviced to remove the vulcanized belts and position unvulcanized belts thereon, the mold is moved over the support rod 38 of the apparatus 40, the support bearings 36 serving to support the mold with the stationary sector 20 uppermost. At this time, the ends 34 and 34ª of the hinge pins 26 and 26ª engage with complementary cups 42 on the mechanism 40, and a button on the mechanism 40 will be pushed which will rotate the cups 42 to rotate the hinge pins 26 and 26ª to collapse the movable sectors 22 and 24 of the mold from the position shown in Fig. 1 to that shown in Fig. 2. Any belts which have been vulcanized on the mold are then removed from the molding grooves 12, and a new set of unvulcanized belts is positioned in the grooves resting down in the molding grooves 12 at the top and down the sides of the stationary sector 20. Thereupon the button on the apparatus 40 is again pushed to rotate the cups 42 in the opposite direction to move the movable mold parts 22 and 24 to the expanded position of Fig. 1.

I have found that I am able to use an endless, flexible, but non-stretching, metal sleeve, or a sleeve made from other material, which can be positioned over the collapsed mold after the belts are mounted thereon so that as the mold is expanded to full size, it will expand tightly inside of the sleeve to form an outer surface for the belts during vulcanization. Such a sleeve is indicated by the numeral 43 in Fig. 7. This procedure is usually faster and more economical than wrapping a cloth or other cover over the outside of the mold after it has been expanded with the unvulcanized belts in position, although the mold of my invention can be used with either type of outer mold cover.

An important part of my invention is the provision of locking means for locking the movable sectors of the mold in the full or expanded position of Fig. 1. One convenient manner of achieving the locking means is to provide one or more locking levers 46 which are pivotally secured by pins 48 to the movable sector 24. One end of the lever 46 is shaped with a beveled and curved offset end 50, the curve being best seen in Fig. 3, and this end is adapted to lock in a groove 52 formed in and behind a block 54 secured to the unhinged edge of the other movable sector 22.

In order to move the levers 46 to locking and unlocking position, I slidably journal a rod 54 in the brackets of the hinge eyes 30ª. The rod 54 has a pivotal connection with the levers 46, and this is conveniently accomplished by securing a spool 56 to the rod adjacent each lever 46. The end of each lever 46 adjacent the rod 54 is bifurcated, as at 58, to straddle the spool 56, and the bifurcated ends of the lever 46 are made circular, as best seen in Fig. 3, so that as the rod 54 is moved back and forth, the levers 46 will be swung about the pivots 48.

A coiled compression spring 60 is positioned between one of the brackets of the hinge eyes 30ª and a collar 62 secured to the rod 54 so that the rod 54 is normally moved to the left in Fig. 3 to hold the levers 46 in locking position. In order to move the levers 46 to an unlocking position, it is necessary to move the rod 54 axially of itself against the spring 60. This action is achieved by providing some suitable mechanism in the support stand 40 for moving the rod 54. Usually the mechanism takes the form of a hydraulic or pneumatic cylinder mounted on an arm 63 which turns with the cup 42, said cylinder having a piston rod 64 which is adapted to move out and engage with the end of the rod 54 and move the rod axially against the action of the spring 60 to throw the levers 46 to the unlocking position. To prevent movement of the mold 10 off or along the support shaft 38 during the action of the piston rod 64, I provide a pin 66 in the end of the shaft 38, the pin 66 being slidably received in a transversely bored hole 68 in the end of the shaft, and with the pin 66 being adapted to be pushed axially of itself from a position entirely within the end of the shaft to a position extending outwardly from the end of the shaft. A spring pressed detent 70 serves to resiliently hold the pin 66 in either its outer locking position or in its inner non-locking position.

From the foregoing, it is evident that the objects of the invention have been achieved by the provision of a simplified, relatively inexpensive, easily operated, and substantially fool-proof structure for vulcanizing V-belts, or other objects.

The improved apparatus can be operated by a semi-skilled workman with a minimum of time and labor, and the products produced by the improved molding apparatus are of uniformly high grade with little or no scrap loss. The use of complicated collapsing structure and mechanism is avoided, and my improved assembly will operate over long periods of time with little or no maintenance and repair problems. Register of the several mold parts is positive, misruns are substantially eliminated, and loading and unloading time is extremely short.

While in accord with the statutes, I have specifically illustrated and described one best known embodiment of my invention, it is to be particularly understood that I am not to be limited thereto or thereby, but that the scope of my invention is defined in the appended claims.

I claim:

1. A collapsible mold for V-belts and the like including a substantially cylindrical body portion having a plurality of grooves in its periphery, each groove being adapted to receive a V-belt, said body being split longitudinally into three parts, namely, one stationary sector, and two movable sectors, hinge means at each longitudinal edge of the stationary sector and pivotally securing a movable sector thereto, the unhinged edges of the movable sectors mating when the sectors are in expanded position, lever means carried by a movable sector and movable to and from locking engagement with the other movable sector with the sectors in expanded position, longitudinally extending rod means slidably journaled in the movable sector carrying the lever means for operating the lever means, said hinge means including hinge pins fixed to the movable sectors and journaled in the stationary sector, said hinge pins extending to a position adjacent the end of the mold from where they can be operated by external means, and means associated with the stationary sector for receiving a support shaft for the mold.

2. A collapsible mold for V-belts and the like including a substantially cylindrical body portion having a plurality of molding cavities in its periphery, said body being split longitudinally into three parts, namely, one stationary sector, and two movable sectors, hinge means at each longitudinal edge of the stationary sector and pivotally securing a movable sector thereto, the unhinged edges of the movable sectors mating with the sectors in expanded position, lever means carried by a movable sector and movable to and from locking engagement with the other movable sector with the sectors in expanded position, longitudinally extending rod means slidably journaled in the movable sector carrying the lever means for operating the lever means, said hinge means including hinge pins fixed to the movable sectors and journaled in the stationary sector, said hinge pins extending to a position adjacent the end of the mold from where they can be operated by external means, and means associated with the stationary sector for receiving a support shaft for the mold.

3. A collapsible mold for V-belts and the like including a substantially cylindrical body portion having a plurality of molding cavities in its periphery, said body being split longitudinally into three parts, namely, one stationary sector, and two movable sectors, hinge means associated with each longitudinal edge of the stationary sector and pivotally securing a movable sector thereto, the unhinged edges of the movable sectors mating when the sectors are in expanded position, means carried by a movable sector and movable to and from locking engagement with the other movable sector with the sectors in expanded position, said hinge means including hinge pins fixed to the movable sectors and journaled in the stationary sector, said hinge pins extending to a position adjacent the end of the mold from where they can be operated by external means, and means associated with the stationary sector for receiving a support shaft for the mold.

4. A collapsible mold for V-belts and the like including a substantially cylindrical body portion having a plurality of molding cavities in its periphery, said body being split longitudinally into three parts, namely, one stationary sector, and two movable sectors, hinge means at each longitudinal edge of the stationary sector and pivotally securing a movable sector thereto, the unhinged edges of the movable sectors mating with the sectors in expanded position, and lever means carried by a movable sector and movable to and from locking engagement with the other movable sector with the sectors in expanded position, said hinge means including hinge pins fixed to the movable sectors and journaled in the stationary sector, said hinge pins extending to a position adjacent the end of the mold from where they can be operated by external means.

5. A collapsible mold for V-belts and the like including a substantially cylindrical body portion having a plurality of grooves in its periphery, each grooves being adapted to receive a V-belt, said body being split longitudinally into three parts, namely, one stationary sector, and two movable sectors, hinge means associated with each longitudinal edge of the stationary sector and pivotally securing a movable sector thereto, the unhinged edges of the movable sectors mating when the sectors are in expanded position, lever means carried by a movable sector and movable to and from locking engagement with the other movable sector with the sectors in expanded position, longitudinally extending rod means slidably journaled in the movable sector carrying the lever means for operating the lever means, and means associated with the stationary sector for receiving a support shaft for the mold.

6. A collapsible mold for V-belts and the like including a substantially cylindrical body portion having a plurality of grooves in its periphery, each groove being adapted to receive a V-belt, said body being split longitudinally into three parts, namely, one stationary sector, and two movable sectors, hinge means at each longitudinal edge of the stationary sector and pivotally securing a movable sector thereto, the unhinged edges of the movable sectors mating when the sectors are in expanded position, said hinge means including hinge pins fixed to the movable sectors and journaled in the stationary sector, said hinge pins extending to a position adjacent the end of the mold from where they can be operated by external means, and means associated with the stationary sector for receiving a support shaft for the mold.

7. A collapsible mold for V-belts and the like including a substantially cylindrical body portion having a plurality of grooves in its periphery, each groove being adapted to receive a V-belt, said body being split longitudinally into three parts, namely, one stationary sector, and two movable sectors, hinge means associated with each longitudinal edge of the stationary sector and pivotally securing a movable sector thereto, the unhinged edges of the movable sectors mating with the sectors in expanded position, said hinge means including hinge pins fixed to the movable sectors and journaled in the stationary sector, said hinge pins extending to a position adjacent the end of the mold from where they can be operated by external means.

8. A mold including a stationary sector, a pair of movable sectors hinged to the stationary sector, means extending adjacent the end of the mold for transmitting force to the movable sectors to move them to and from an expanded or collapsed position, lock means for securing the movable sectors in expanded position, and independent means extending adjacent the end of the mold and adapted to transmit unlocking force to the lock means, said mold having a plurality of grooves cut in its outer surface for receiving belts or the like to be vulcanized.

9. A mold including a stationary sector, a pair of movable sectors hinged to the stationary sector, the unhinged ends of the movable sectors overlapping in beveled relation when in expanded position, means extending adjacent the end of the mold for transmitting force to the movable sectors to move them to and from an expanded or collapsed position, lever lock means for securing the movable sectors in expanded position, and separate means extending adjacent the end of the mold and adapted to transmit unlocking force to the lock means, said mold having a plurality of grooves cut in its outer surface for receiving belts or the like to be vulcanized.

10. A mold including a stationary sector, a pair of movable sectors hinged to the stationary sector, the unhinged ends of the movable sectors overlapping in beveled relation when in expanded position, means extending adjacent the end of the mold for transmitting force to the movable sectors to move them to and from an expanded or collapsed position, said mold having a plurality of grooves cut in its outer surface for receiving belts or the like to be vulcanized, and an endless flexible, but non-stretching, sleeve into which the mold can be expanded.

11. A mold including a stationary sector, a pair of movable sectors hinged to the stationary sector, the unhinged ends of the movable sectors overlapping in beveled relation when in expanded position, lock means for securing the movable sectors in expanded position, means extending adjacent the end of the mold and adapted to transmit unlocking force to the lock means, said mold having a plurality of grooves cut in its outer surface for receiving belts or the like to be vulcanized, and an endless metal sleeve into which the mold can be expanded.

12. A mold including a stationary sector, a pair of movable sectors hinged to the stationary sector, the unhinged ends of the movable sectors overlapping in beveled relation when in expanded position, means extending adjacent the end of the mold for transmitting force to the movable sectors to move them to and from an expanded or collapsed position, lock means for securing the movable sectors in expanded position, means separate from the last-named extending means and extending adjacent the end of the mold and adapted to transmit unlocking force to the lock means, and an endless flexible sheet metal sleeve into which the mold can be expanded.

13. A mold including a stationary sector, a pair of movable sectors hinged to the stationary sector, all of said sectors having V-belt receiving grooves on their outer surfaces, and an endless flexible non-expanding sleeve which is cylindrically-flat inside and out into which the mold can be expanded, and with the expanded mold having an outside circumference substantially equal to the inside circumference of the sleeve.

14. A mold including a stationary sector, a pair of movable sectors hinged to the stationary sector, the unhinged ends of the movable sectors overlapping in beveled relation when in expanded position, means extending adjacent the end of the mold for transmitting force to the movable sectors to move them to and from an expanded or collapsed position, lock means for securing the movable sectors in expanded position, and separate means extending adjacent the end of the mold and adapted to transmit unlocking force to the lock means.

15. A mold including a stationary sector, a pair of movable sectors hinged to the stationary sector, means for moving the movable sectors to and from expanded position, lock means independent of the means for moving the sectors for securing the movable sectors in expanded position, and means extending adjacent the end of the mold and adapted to transmit unlocking force to the lock means, said mold having a plurality of grooves cut in its outer surface for receiving belts or the like to be vulcanized.

JOHN F. CAMPBELL.

REFERENCES CITED

The following references are of record in the file of this patent:

UNITED STATES PATENTS

| Number | Name | Date |
|---|---|---|
| 1,729,329 | Chilton | Sept. 24, 1929 |
| 2,014,010 | Wheatley | Sept. 10, 1935 |
| 2,114,785 | Porter | Apr. 19, 1938 |
| 2,253,792 | Leavenworth | Aug. 26, 1941 |
| 2,267,243 | MacMillan | Dec. 23, 1941 |

FOREIGN PATENTS

| Number | Country | Date |
|---|---|---|
| 385,495 | France | May 13, 1908 |